United States Patent [19]

Straughan

[11] 4,134,782
[45] Jan. 16, 1979

[54] METHOD FOR SIMULTANEOUSLY APPLYING TO AN EXTENDED CYLINDRICAL OBJECT A COATING AND A PLASTIC FILM WRAPPING TO RETAIN THE COATING

[75] Inventor: Clemens F. Straughan, Tulsa, Okla.

[73] Assignee: C F S Corporation, Tulsa, Okla.

[21] Appl. No.: 623,652

[22] Filed: Oct. 20, 1975

Related U.S. Application Data

[60] Continuation-in-part of Ser. No. 447,651, Mar. 4, 1974, abandoned, which is a division of Ser. No. 142,452, May 12, 1971, Pat. No. 3,813,272.

[51] Int. Cl.² .................. B29D 27/04; B29D 23/00
[52] U.S. Cl. ................................ 156/79; 156/203; 264/45.8; 264/46.5; 264/46.7; 264/46.9
[58] Field of Search ............... 264/26, 45.9, 45.8, 264/46.5, 46.7, 46.9; 156/200, 79, 203; 138/149; 425/817 C

[56] References Cited

U.S. PATENT DOCUMENTS

| | | | |
|---|---|---|---|
| 1,810,585 | 6/1931 | Young ................................. | 156/203 |
| 3,042,103 | 7/1962 | McDevitt et al. ................. | 156/203 X |
| 3,060,513 | 10/1962 | Klink et al. ....................... | 264/26 |
| 3,118,800 | 1/1964 | Snelling ............................ | 264/46.2 X |
| 3,131,240 | 4/1964 | Kirkpatrick ...................... | 264/45.9 X |
| 3,223,571 | 12/1965 | Straughan ........................ | 156/200 X |
| 3,309,458 | 3/1967 | Yoshimura et al. ............. | 264/45.8 X |
| 3,366,719 | 1/1968 | Lueders ............................ | 264/46.5 X |
| 3,383,257 | 5/1968 | James ................................ | 156/203 X |
| 3,432,582 | 3/1969 | Bender ............................. | 264/46.5 X |
| 3,434,502 | 3/1969 | Snelling ............................ | 138/149 X |
| 3,779,836 | 12/1973 | Henry et al. ..................... | 156/203 X |
| 3,797,981 | 3/1974 | Van Dijk .......................... | 264/45.8 |
| 3,985,483 | 10/1976 | Clay et al. ....................... | 425/817 C X |
| 4,025,375 | 5/1977 | Leasure ............................ | 156/79 |

Primary Examiner—Philip Anderson
Attorney, Agent, or Firm—Head, Johnson & Chafin

[57] ABSTRACT

This invention involves the method and apparatus for simultaneously placing a coating of a selected material on the outer surface of an extended cylindrical object such as a pipe or conduit, and holding the coating in position by wrapping the coating with a strip of thin film formed to a cylindrical contour and sealed with a longitudinal seam. This is accomplished in one mode by inserting the pipe through a tubular concentric mandrel, wrapping and sealing the plastic film against the mandrel and injecting the coating material through the annular space between the pipe and the mandrel and thus into the space between the pipe and the sealed plastic film. Using heat shrinkable plastic the film forms a tightly fitting cover for the pipe coating material.

4 Claims, 5 Drawing Figures

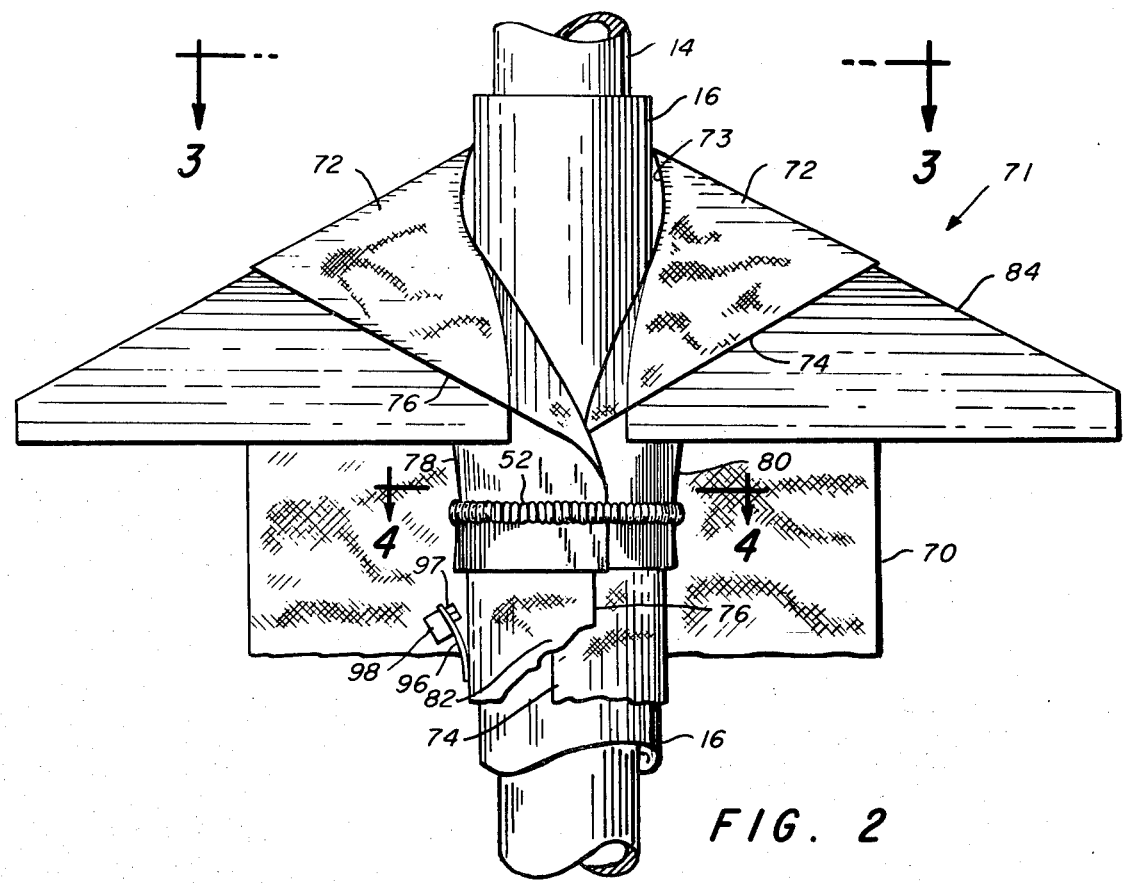
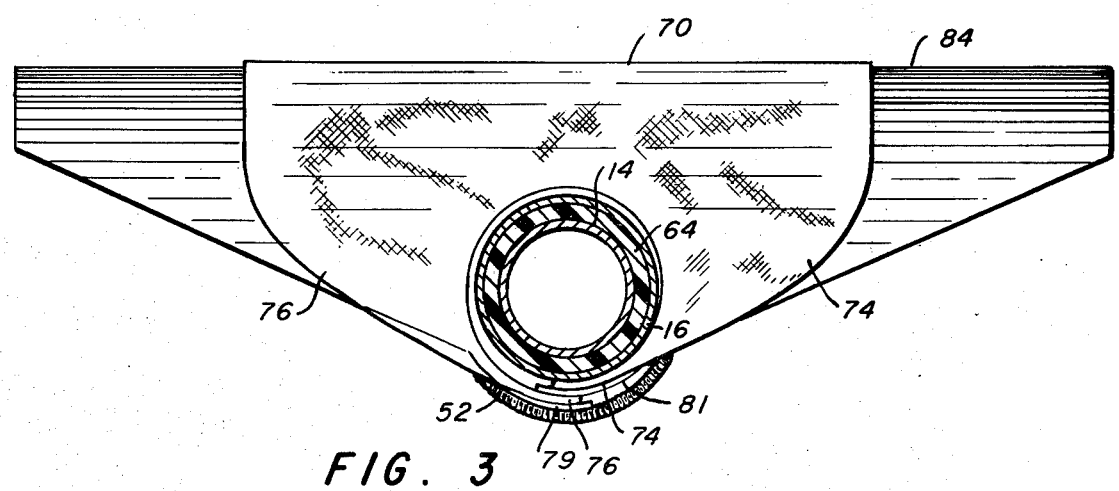

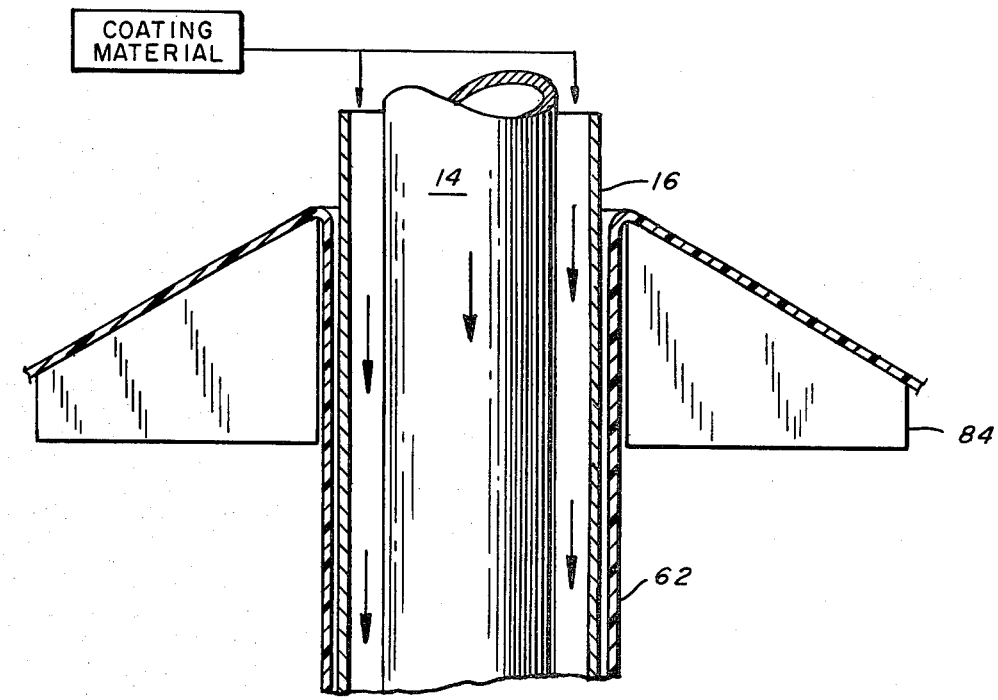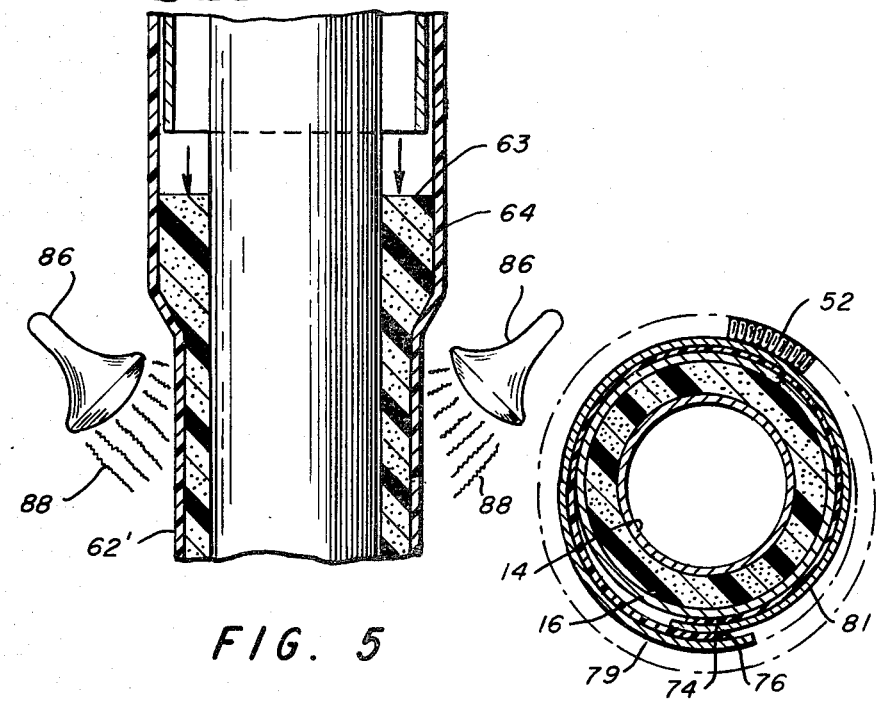
FIG. 5
FIG. 4

METHOD FOR SIMULTANEOUSLY APPLYING TO AN EXTENDED CYLINDRICAL OBJECT A COATING AND A PLASTIC FILM WRAPPING TO RETAIN THE COATING

CROSS REFERENCE TO RELATED PATENTS AND APPLICATIONS

This Application is a Continuation-in-Part of Co-pending Application Ser. No. 447,651, filed Mar. 4, 1974, now abandoned, which was a Divisional Application of Ser. No. 142,452, filed May 12, 1971, now U.S. Pat. No. 3,813,272, issued May 28, 1974.

This Application is related to my U.S. Pat. No. 3,223,571, issued Dec. 14, 1965, entitled: Apparatus for Applying a Plastic Film Wrapping to a Pipe Line.

BACKGROUND OF THE INVENTION

1. Field of the Invention.

This invention is in the field of pipe coatings and protective wrappings. More particularly it is concerned with the application to long cylindrical tubes or pipes, of uniform circumferential coatings with selected materials, and the protection of the coatings by means of sealed wrappings with films of plastic, paper, etc. Still more particularly this invention is concerned with the simultaneous application of a continuous flexible plastic or synthetic film or wrap to a cylindrical object such as a pipe or conduit, and the injection of a circumferential coating of a selected material in the annular space between the object and the film.

2. Prior Art

Pipelines are typically coated with a helically wound wrap of a chemically treated paper or similar protective material. The wrap is sometimes bound to the pipe by an undercoating of adhesive or similar material applied to the pipe by brush, or the like. This process is only workable when the applied coating is very thin, of the proper nature, and of the proper consistency. If thick coatings are applied by this method, pressure of the wrapping tends to distort the thickness and character of the coating, with unsatisfactory results.

The prior art references made of record and noted to the Patent and Trademark Office in said prior related Patents and Applications is incorporated by reference herein.

SUMMARY OF THE INVENTION

This invention is based upon and is an improvement over my U.S. Pat. No. 3,223,571 in which a strip of plastic film is wrapped or formed about a pipe, to form a longitudinal overlapped seam, with the plastic film forming a complete and void-free protective coating. In one embodiment of this invention the pipe is surrounded by a coaxial cylindrical, semi-cylindrical, or arcuate member termed herein as "mandrel" radially spaced from the pipe. The plastic film is formed and sealed to form a closed, substantially coaxial covering about the mandrel and pipe. The coating material is injected into the annular space between the pipe and the film covering. Then as the pipe moves through the mandrel, the cylindrical formed film goes with it and the injected coating material. If desired the film can be of a heat shrinkable composition, so that after injection of the coating material, the plastic film is caused to shrink into tight contact with the coating.

It is therefore an object of this invention to provide a method and apparatus for substantially simultaneously applying a uniformly thick coating of a selected material to a pipe or conduit and applying, forming and sealing a layer of plastic film to contain and protect the applied coating. This is accomplished within this broad object and claims, with or without what is defined herein as "mandrel".

It is a further object to accomplish this with a pipeline-travelling device or apparatus through which the pipe or conduit will traverse.

These and other objects and a better understanding of this invention will be apparent from the following description taken in conjunction with the appended drawings, in which:

BRIEF DESCRIPTION OF THE DRAWINGS

FIG. 2 is a top view of the folder of this invention.

FIG. 3 is a front view of the film folding device as taken along 3—3 of FIG. 2.

FIG. 4 is a sectional view taken along the line 4—4 of FIG. 2.

FIG. 5 is a diametrical section taken through the axis of the mandrel.

DESCRIPTION OF THE PREFERRED EMBODIMENTS

Figure 1:
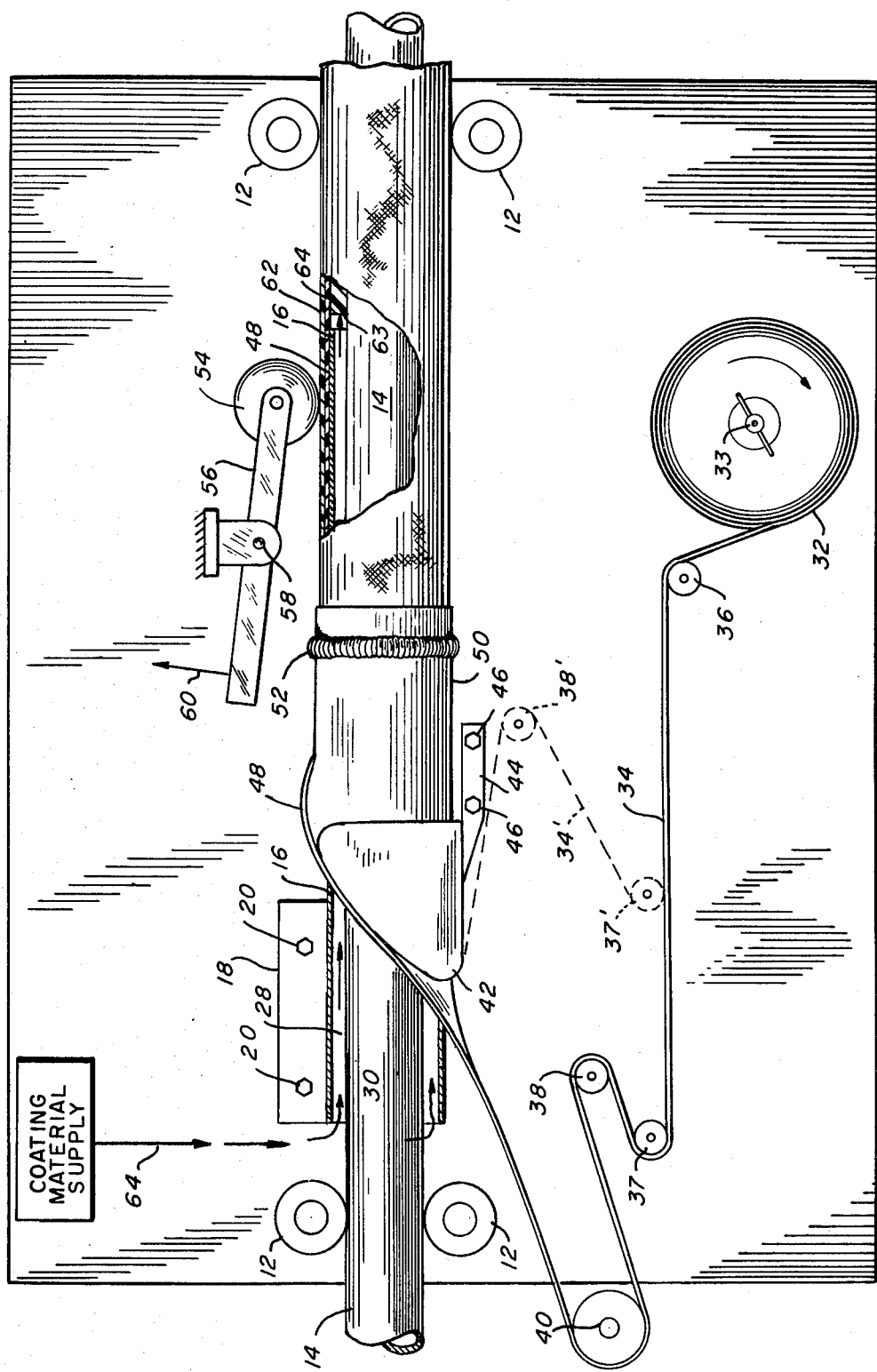
FIG. 1 is a general view of the apparatus of the method of this invention.

Referring to the drawings, FIG. 1 shows a general view of one embodiment of this invention. Numeral 10 refers to a frame adapted to support, or to be supported by a pipe or conduit 14 and adapted to be relatively traversed with respect to the pipe in the direction of the pipe. This is accomplished by means of rollers 12, which may simply be idlers, or they may be powered by motor means, not shown but well known in the art.

Mounted to the frame 10 by bracket 18 and bolts 20 is a thin-walled cylindrical mandrel 16 which is concentric with and spaced from the pipe. The purpose of the mandrel is to provide a form about which a strip of plastic or other sheet material can be formed and sealed into a thin-walled cylinder concentric with the pipe, although the invention can be performed without said mandrel or other object used like a mandrel. The difference in diameter between the pipe and the plastic cylinder provides an annular space into which a selected coating material can be injected. Such a coating can be of any desired composition that has the required physical properties, such as formed plastic, cement, aggregates of various types, etc.

Mounted on the frame 10 is a roll 32 of thin flexible film stock, ribbon, or wrapping material 34 with its axis 33 substantially transverse to the axis of the pipe. This strip can be taken from the roll, over rollers 36, 37, 38 and over transverse roller 40, turned back, and formed around the mandrel 16 by means of the folding device 42 which will be described in detail in accordance with FIGS. 2 and 3. As it passes through folder 42, the strip is wrapped around the mandrel with edges 48 overlapping. The folder 42 is fastened to the frame 10 by means of bracket 44 and bolts 46. The folder 42 has cylindrical leaf extensions 50 that assist in the forming of the overlapped edges of the plastic film.

The film 34 can be made from any material that is suitably foldable or flexible and retainable about the pipe and possessing the properties necessary for retaining the coating 64 and protecting the pipe and coating from corrosion, erosion and mechanical damage. In addition, the film or wrapping material is to be relatively strong and of low, or practically nil moisture-vapor-transmission characteristics, in addition to high insulating and dielectric properties. It has been found that many films having heat shrinkable characteristics generally possess desirable properties and are of excellent utility in this invention. many materials presently available from which the heat shrinkable films may be made include vinyl plastics such as polyvinyl chloride, polyvinylidine chloride, vinyl chloride acetate copolymers, and polyolefins such as polyethylene and many others. A number of these are enumerated in my U.S. Pat. No. 3,223,571.

These plastics while being waterproof, tough, flexible and easily foldable, also possess highly desirable dielectric properties. Accordingly, these plastic films when used in accordance with the invention not only prevent direct contact between the pipe and/or coating and ground or moisture, but also effectively insulate the pipe from stray electric currents.

Although these films are generally of a thickness equal to or less than ten thousandths of an inch, this figure is not an absolute upper limit of the usable thickness. Generally, the pipe size, coating thickness, foldability, type of film and type of film folder will be one, all or some of the determining factors in deciding the upper limit on the usable thickness of a particular film. It is possible in some cases to increase the usable thickness of a particular film beyond this upper limit, by preheating the film before folding or forming it about the pipe.

A film sealing means 54 in the shape of a wheel or roller is journaled on arm 56 pivoted at 58 and pressed into contact with the overlapped edges of the film. The pressure is applied between the mandrel 16 and the roller 54.

Sealing of the overlapped edges may be effected by applying a suitable adhesive material or film solvent to one of the two edges, and pressing the other edge against this adhesive or solvent strip. Another highly effective method of sealing the overlapped edges of a plastic film is by the application of heat to the area of overlap to weld the joint. Sufficient heat must be applied to cause the overlapped edges of the plastic to partially melt and their adjacent surfaces flow together. When the edges cool, a strong seal is effected between them. Heat for such purpose can be obtained from a heating element housed in the roller 54. This is the preferred method.

A relatively new means for sealing overlapped edges of a plastic film utilizes ultrasonic vibrations. For example, an ultrasonic vibrating member that is positioned such that it will traverse the area of overlap will seal the edges. Ultrasonic vibrations transmit energy through the overlapped edges of a plastic in such a way that the surfaces to be joined are brought within atomic distances of each other, and thus adhere positively without heat or adhesive.

It will be understood, of course, that any other plastic material such as treated paper and/or cloth can be used. Also other sealing means for effectively sealing the longitudinal edges of this film wrap may be used without departing from the scope of this invention. For example, while I speak of overlapped edges which are sealed together by means of cement, other adhesives, heat, etc., it will be clear that the edges need not overlap but can abut each other, or even be parallel and slightly spaced from each other, with a narrow strip of adhesive coated type covering the joint and holding the edges in place. Conventional pressure sensitive tape can be used for this purpose.

In FIG. 1 I show the strip or ribbon 34 of plastic film being unrolled from roll 32. There is sufficient friction in support bearings 33 and in the rollers 36, 37, 38 so that the strip is pulled tight as movement of the frame 10 to the left, or the pipe 14 to the right, causes the strip to be rolled around roller 40. The folder 42 can be a simple frustoconical cylinder within which the pipe passes to the right, toward the portion of smaller diameter, causing the film to be pressed more closely and more tightly around the mandrel 16.

Alternatively the strip can be wound (as shown by the dashed line 34) around rollers 37' and 38' and then into the folder 42 which would then be a reversing folder. This reversing type folder obviates the need of the reversing roller 40. The folder described in my U.S. Pat. No. 3,223,571 is of this type and I have patterned FIGS. 2, 3 and 4 after the correspondingly numbered drawings in U.S. Pat. No. 3,223,571.

Referring now to FIGS. 2, 3 and 4, reversing film folder 71 surrounds the mandrel 16, while the pipe 14 passes through the mandrel coaxially. There is a selected radial spacing between the pipe and the mandrel which will determine the thickness of the circumferential coating on the pipe. The reversing film folder 71 consists of a combination of a pair of smooth curve, wing-shaped shoulder portions 84 and a rearward tubular portion 80. The shoulder portions 84 are made from a rigid material such as hard plastic or metal. A longitudinal circular opening 73 is provided in the curved upstream surface of the wing shaped shoulder portions 84 where they are joined for the axial passage of the pipe 14 and mandrel 16 therethrough. The diameter of this opening is sufficiently larger than the diameter of the mandrel so that the wrapping of the film will not be too tight, and therefore generate too much friction.

As the fold and overlapping edges are formed the plastic film continuously moves to the right over the surface of the mandrel. Any means possible for reducing the friction of the movement of the plastic over the mandrel 16 can be used such as coating the outer surface of the mandrel with friction reducing materials such as is sold under the Registered Trademark "Teflon", or the use of sprays of powder or liquid to lubricate the movement of the plastic. Such powders and liquids are well known in the art and, of course, must be be compatible with the material of the coating.

The tubular member 80 extending rearwardly of shoulder portion 84 is a flexible tubular member, overlappingly split longitudinally to cause the final overlapping fold of the film 34 about the mandrel 16. The split begins at the opening 73 and extends downstream therefrom in a substantially V-shaped configuration as shown at 73' and forms two leaves, forming the end tabs 81 and 79 respectively. Tabs 81 and 79 are expansibly retained in their overlapped position either by inherent springiness or by one or more expansible circular spring elements 52. As the film ribbon is drawn over the smooth curved shoulder portion 84, it is automatically shaped into a continuous tubular wrap about mandrel 16. Film strip or ribbon 34 is of sufficient width that its edges overlap 80 when it is folded about the mandrel. Tabs 81 and 79 function as guide members for automatically guiding the longitudinal edges of the strip into the overlapped position. That is, one film strip edge, the inner one 74, will be drawn through the space between tab 81 and the exterior of the mandrel 16, and the other edge 76 will be drawn into and through the space between the tab 81 and overlapping tab 71.

Once the film has been formed and overlapped about the mandrel, they can be held in position by spring elements similar to 52 until the film passes the sealing means 54. Alternatively a plurality of circumferentially positioned leaf springs similar to 96 in FIG. 2 held by support 98 can be used to keep the film in position.

Referring now to FIG. 5, I show the coating material 64 being injected through the annular space between pipe 14 and mandrel 16 into the annular space between the film cylinder 62 and pipe 14 at point 63. Whether mandrel 16 is used or not the coating material or materials used to create the coating are injected at said point 63 which is a point downstream and between the film folder 71, or mandrel 16 if used where the preformed cylinder 2 is substantially unsupported, and the first support roller 12 for the newly coated pipe. The plastic film 62 is sealed by roller 54, or by other means before it leaves the mandrel. After the plastic leaves the mandrel and the coating material 64 is injected, heating means 86 irradiating 88 the film 63 will cause it to shrink and fit tightly to the coating as shown at 62'. While I show the use of a heat-shrinkable plastic material and a radiant heating means, it will be clear that this invention does not require such material, but can be used equally well with non-shrinking sheet film.

Although the invention has been described with particular emphasis on the use of synthetic materials as the wrapping material, it is to be understood that any other material possessing the necessary strength, protective, forming and sealing characteristics and capable of being formed from a continuous flat, flexible ribbon stage to a stage about the mandrel, can be used. Such other material may include a chemically treated, relatively moisture proof fibrous material, such as paper, glass, metal or metal foil, etc.

In using a coating of a foam creating material the exothermic heat of reaction in many instances is insufficient to weld and seal the films such as polyethylene without further aids.

Also, while I have described my invention in terms of a pipe or pipeline, it can be applied equally well to the coating of many other classes of long cylindrical objects, such as rods, wire and cable which is inclusive of the term "conduit" as used herein.

While I have described my invention with reference to specific preferred embodiments, it will be understood that many modifications may be made without departing from the spirit and scope of the invention. Thus, this invention should be construed not to be limited to the embodiments herein described but should be limited only by the scope of the appended claim or claims with each element or step being accorded the full range of equivalency to which it is entitled.

What is claimed:

1. A method of placing a coating of a foamed plastic retained on an extended conduit comprising the steps of:
    (a) feeding said conduit into and through a concentric tubular mandrel spaced from said conduit and supported on a frame;
    (b) moving said conduit and said frame relative to each other;
    (c) feeding a continuous strip of said film in a direction colinear with said conduit;
    (d) wrapping said film about said mandrel and said conduit to form longitudinal joined contiguous edges of said film forming, downstream thereof, an unsupported cylindrical tubular form surrounding said conduit and of selected diameter larger than said conduit to form said annulus space;
    (e) sealing the edges of said film;
    (f) moving said tubular form in synchronism with the movement of said conduit; and
    (g) injecting into the annular space between said conduit and said unsupported tubular form of film the chemical materials required to form, in situ and downstream of said mandrel, and to fill said annulus with said foamed plastic.

2. The method as in claim 1, in which said film comprises a heat shrinkable synthetic resin film and including the additional step of radiantly heating said tubular form, whereby it will shrink tightly about said coating.

3. A method of placing a coating of a foamed plastic retained on an extended conduit comprising the steps of:
    (a) feeding said conduit into and through a concentric film folder spaced from said conduit and supported on a frame;
    (b) moving said conduit and said frame relative to each other;
    (c) feeding to said film folder a continuous strip of said film in a direction colinear with said conduit;
    (d) forming, by the passage through said film folder, said film about said conduit to form longitudinal contiguous joined edges of said film creating, downstream thereof, an unsupported cylindrical tubular form surrounding said conduit and of selected diameter larger than said conduit to form said annulus space;
    (e) moving said tubular form in synchronism with the movement of said conduit;
    (f) sealing the edges of said film; and
    (g) injecting into the annular space between said conduit and said unsupported tubular form of film the chemical materials required to form, in situ and downstream of said film folder and to fill said annulus with said foamed plastic.

4. The method as in claim 3 in which said film comprises a heat shrinkable synthetic resin film and including the additional step of radiantly heating said tubular form, whereby it will shrink tightly about said coating.

* * * * *